(12) United States Patent
Chhabra et al.

(10) Patent No.: US 11,417,031 B2
(45) Date of Patent: Aug. 16, 2022

(54) HIGHLIGHTING A TAGGED OBJECT WITH AUGMENTED REALITY

(71) Applicant: Micron Technology, Inc., Boise, ID (US)

(72) Inventors: Bhumika Chhabra, Boise, ID (US); Radhika Viswanathan, Boise, ID (US); Carla L. Christensen, Boise, ID (US); Zahra Hosseinimakarem, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 31 days.

(21) Appl. No.: 16/987,664

(22) Filed: Aug. 7, 2020

(65) Prior Publication Data
US 2022/0044449 A1     Feb. 10, 2022

(51) Int. Cl.
| G06T 11/00 | (2006.01) |
| G01C 21/36 | (2006.01) |
| G06Q 30/00 | (2012.01) |
| G06Q 50/28 | (2012.01) |
| G06Q 30/06 | (2012.01) |

(52) U.S. Cl.
CPC .......... *G06T 11/00* (2013.01); *G01C 21/3626* (2013.01); *G06Q 30/0185* (2013.01); *G06Q 30/0639* (2013.01); *G06Q 50/28* (2013.01); *G06T 2200/24* (2013.01)

(58) Field of Classification Search
CPC ........ G06T 11/00; G06T 19/006; G06T 7/579
See application file for complete search history.

(56) References Cited

U.S. PATENT DOCUMENTS

| 10,565,854 | B2 * | 2/2020 | Kitada ............... G08B 21/0275 |
| 10,694,328 | B2 | 6/2020 | Engelen et al. |
| 11,037,573 | B2 * | 6/2021 | Arantes .................. G06Q 50/30 |
| 2014/0044305 | A1 * | 2/2014 | Scavezze ............... H04B 1/385 382/103 |
| 2015/0235474 | A1 * | 8/2015 | Mullins ................. G06T 19/006 345/419 |
| 2017/0228596 | A1 * | 8/2017 | Wexler ............... G06K 9/00389 |
| 2018/0224804 | A1 * | 8/2018 | Berardinelli ......... G04G 99/006 |
| 2019/0114899 | A1 * | 4/2019 | Kitada .................. G09G 3/003 |
| 2020/0209095 | A1 | 7/2020 | Swissa |
| 2020/0218899 | A1 | 7/2020 | Lamont |
| 2020/0234394 | A1 | 7/2020 | Calhoon et al. |

* cited by examiner

*Primary Examiner* — Thomas J Lett
(74) *Attorney, Agent, or Firm* — Brooks, Cameron & Huebsch, PLLC

(57) ABSTRACT

Methods and devices systems related to a computing device for highlighting a tagged object with augmented reality (AR) are described. An example method can include identifying, using a computing device, an object tagged with a sensor within a plurality of objects. The example method can include tracking movement of the object based on communication between the sensor and the computing device and highlighting the object via AR based on the tracking and responsive to a request to locate the object.

20 Claims, 3 Drawing Sheets

HIGHLIGHTING A TAGGED OBJECT WITH AUGMENTED REALITY

TECHNICAL FIELD

The present disclosure relates generally to a computing device, and more particularly, to methods, apparatuses, and systems related to augmented reality (AR).

BACKGROUND

A computing device can be, for example, a personal laptop computer, a desktop computer, a smart phone, a tablet, a wrist-worn device, a digital camera, and/or redundant combinations thereof, among other types of computing devices.

AR can overlay virtual objects on a real-world (e.g., natural) environment. In some examples, AR can be an interactive experience of a real-world environment where real-world objects are enhanced by computer-generated perceptual information. The AR can mask a portion of the real-world environment and/or add to the real-world environment such that it is perceived as an immersive aspect of the real-world environment. Accordingly, AR can alter a person's perception of a real-world environment.

DETAILED DESCRIPTION

Figure 1:
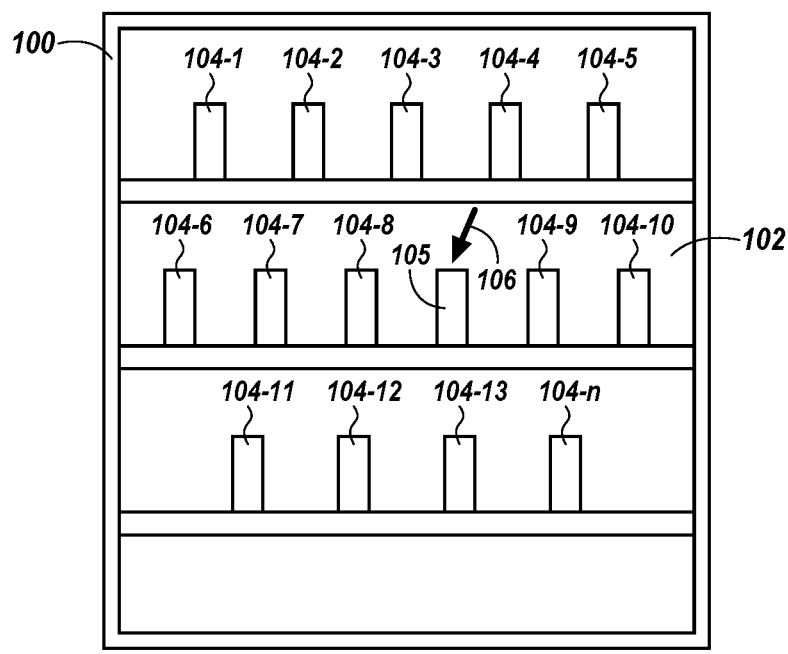
FIG. 1 illustrates an example of a user interface of a computing device for highlighting a tagged object with AR in accordance with a number of embodiments of the present disclosure.

Inventory includes goods and materials held by an individual or business. For instance, inventory for a business may include goods and materials held with an ultimate goal of resale or for later use. For an individual, inventory may include items in his or her home, in a jewelry box, etc.

Locating items in an inventory or elsewhere may include utilizing a physical map of the inventory or a numerical system. For instance, a furniture warehouse may include numbered shelves used to determine locations of objects. Items may also include barcodes that can be scanned, and their location entered into an inventory system. However, such locating approaches may not allow for a visualization of where the object is, or account for lost or moved items.

In contrast, examples of the present disclosure include methods and apparatuses related to highlighting a tagged object with AR. An example method includes identifying, using a computing device, an object tagged with a sensor within a plurality of objects, tracking movement of the objected based on communication between the sensor and the computing device, and highlighting the object via AR based on the tracking and responsive to a request to locate the object.

A tagged object includes an object marked or "tagged" with a sensor for tracking and/or other purposes. The sensor can be communicatively coupled to a computing device for tracking purposes. As used herein, "communicatively coupled" can include coupled via various wired and/or wireless connections between devices (e.g., the sensor and the computing device) such that data can be transferred in various directions between the devices. The coupling need not be a direct connection, and in some examples, can be an indirect connection.

A highlighted object includes an emphasized object. For instance, a highlighted object may be literally highlighted (e.g., highlighted by a color), enlarged, or marked (e.g., an arrow pointing to it), among other highlighting methods. In some examples, an object desired by a user can be found and highlighted via AR to the user via a user interface of a computing device. For instance, a jeweler looking for a particular diamond within a plurality of diamonds in a vault can view the vault via a user interface (e.g., display) of a tablet and using AR the particular diamond is highlighted and can be found by the jeweler faster as compared to other locating approaches. The jeweler may also be notified in particular objects change locations based on communication between the sensors tagging the jewelry and the computing device.

As used herein, "a number of" something can refer to one or more of such things. For example, a number of computing devices can refer to one or more computing devices. A "plurality" of something intends two or more. Additionally, designators such as "Y", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, reference numeral 102 may reference element "02" in FIG. 1, and a similar element may be referenced as 202 in FIG. 2. Multiple analogous elements within one figure may be referenced with a reference numeral followed by a hyphen and another numeral or a letter. For example, 104-1 may reference element 04-1 in FIGS. 1 and 104-2 may reference element 04-2, which can be analogous to element 04-1. Such analogous elements may be generally referenced without the hyphen and extra numeral or letter. For example, elements 104-1 and 104-2 may be generally referenced as 104. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 illustrates an example of a user interface 102 of a computing device 100 for highlighting a tagged object 105 with AR in accordance with a number of embodiments of the present disclosure. The user interface 102 can be generated by the computing device 100. The user interface 102 can be a graphical user interface (GUI) that can provide and/or receive information to and/or from the user of the computing device 100. The user interface 102 can be shown on a display of the computing device 100. In some examples, the display can be a touchscreen.

The computing device may be a smartphone, tablet, or other device having a camera or cameras and AR capabilities. In a number of embodiments, AR can be used through location services (e.g., GPS, gyroscope, accelerometer, etc.), one or more of the cameras (e.g., camera 428 in FIG. 4), or a combination thereof. In some examples, one of the cameras can be used solely for AR purposes (e.g., an AR-specific camera). In a number of embodiments, one or more optical sensors can be used with one or more cameras for the AR or, in contrast, one or more optical sensors can be used instead of one or more cameras for the AR. AR can overlay virtual objects on a real-world environment to mask a portion of the real-world environment and/or add to the real-world environment such that it is perceived as an immersive aspect of the real-world environment. In some examples, AR can display and/or automate a number of images and/or enhance an AR image to move and/or change on the user interface 102. For instance, the AR image can include an image of an object that resides in the real world but is enhanced by computer-generated perceptual information. The AR image can include information that is additive to the natural environment of the object or information that masks the natural environment. In some examples, the AR image can be perceived as an immersive aspect of the real environment (e.g., components of the digital world blend into a user's perception of the real word).

In some examples of the present disclosure, a user may desire to locate a particular object, for instance within a plurality of objects. For example, the objects in FIG. 1 may be medicinal vials 104-1, 104-2, . . . , 104-n and the object 105 within a refrigerator of a lab. The vials 104 and/or the object 105 may be tagged with sensors. A lab technician may desire to locate the object 105 (which may also be a medicinal vial). However, the objects 104 and the object 105 may all look the same or similar, for instance, they may all be the same type of vial, but they have different contents, which may create challenges in locating the object 105. In addition, the object 105 may have been moved or misplaced, so even if a mapping or other inventory technique is used, it may be difficult to find the object 105.

In such an example, a user can request a location of the object 105, and using AR, the user can view the refrigerator holding the vials 104 and the object 105. If the object 105 has been tagged, the object 105 can be highlighted, for instance with an arrow 106, allowing the user to visually see where to find the object 105. The object 105 may be located quickly, which may be desired in this example, not only for user satisfaction, but also to reduce the amount of time the refrigerator is left open and exposing the other vials 104 to warmer temperatures.

Inventory of the vials 104 and the object 105 can also be maintained in some examples. For instance, if the vials 104 and the object 105 are tagged, an inventory can be maintained such that when a vial 104 or the object 105 is removed from the refrigerator or a new vial is added, the inventory is updated. In some instances, a user may receive a notification when inventory changes are made. Notifications can include visual notifications (e.g., email, banner, etc.), audible notifications, or physical notifications, among others. A user may choose particular settings based on his or her preferences, in some instances. While vials are used as an example herein, other objects may be tagged and highlighted.

In some examples, an AR application can be used to highlight the object 105. For example, the computing device 100 can receive a trigger to launch an AR application on the computing device 100 and can launch the AR application in response. For instance, the trigger may include a user requesting to launch the AR application on the computing device 100, the user launching an AR-specific camera on the computing device 100, or the computing device 100 detecting a location change of the object 105 (e.g., a location change of the sensor tagging the object 105) and launch the AR application. The AR application, in some examples, can allow a user to access information by scanning or viewing an image with the computing device 100 (e.g., marker-based), by using markerless AR techniques, by using location-based AR, or a combination thereof. The AR application, in some instances, may utilize simultaneous localization and mapping.

Once the AR application is launched, the computing device 100 can track a location and/or movement of the tagged object 105. This can be done via communication between the computing device 100 and the sensor and may include the use of GPS, an accelerometer, a gyroscope, or any combination thereof, among others. For instance, the tagged object 105 may be moved from a first location in a refrigerator to a second, different location in the same or different refrigerator. These movements can be tracked. When a user desires to locate the object 105, the location can be highlighted based on the tracked movement and displayed via AR.

Figure 2:
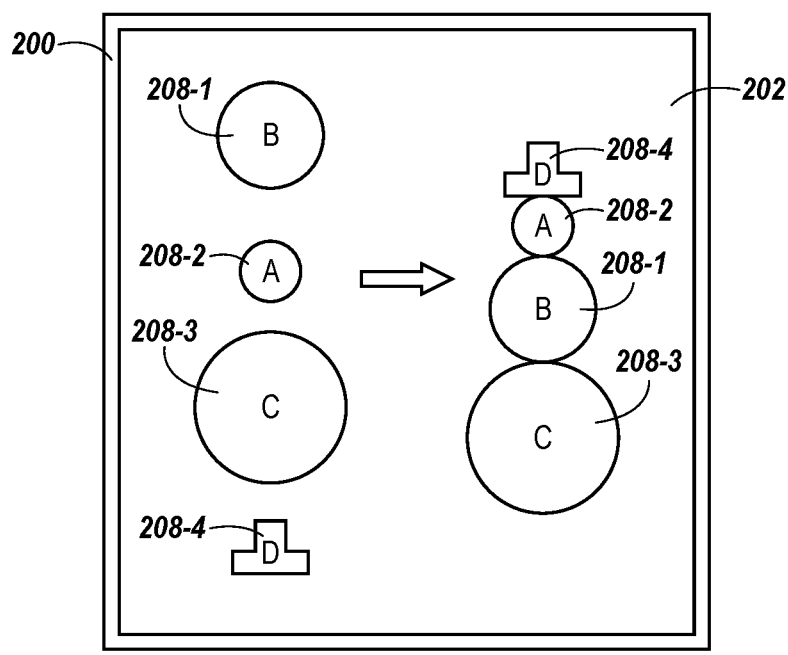
FIG. 2 illustrates another example of a user interface of a computing device for highlighting a tagged object with AR in accordance with a number of embodiments of the present disclosure.

FIG. 2 illustrates another example of a user interface 202 of a computing device 200 for highlighting a tagged object 208 with AR in accordance with a number of embodiments of the present disclosure. In some examples, the tagged object 208 may be assembled using AR. For instance, a user may purchase an item such as a piece of furniture or a children's toy that requires assembly before use. In such an example, parts of the item (e.g. objects) may be tagged. As illustrated in FIG. 2, upon receiving a request at the computing device 200 to locate an object and/or assemble the item or launching an AR camera, an AR application can be launched to illustrate assembly of an item.

For instance, a user may place objects 208-1, 208-2, 208-3, and 208-4 on the on the floor and view the objects using AR via the user interface 202. The objects 208-1, 208-2, 208-3, and 208-4 may be highlighted, for instance by the letter B, A, C, D respectively, allowing the user to identify each object 208. In some examples, assembly of the item using the objects 208 can be illustrated, as shown in FIG. 2 as an assembled snowman. The highlighted objects 208 remain highlighted in the assembled object to aide in assembly by the user.

Figure 3:
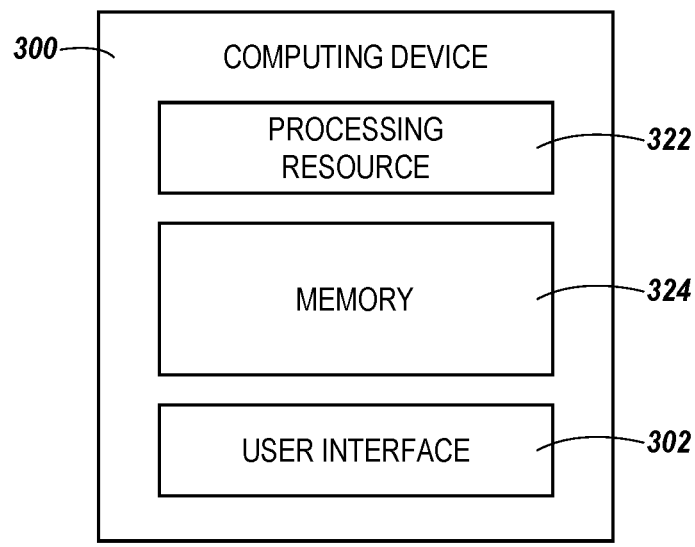
FIG. 3 illustrates an example of a computing device used for highlighting a tagged object with AR in accordance with a number of embodiments of the present disclosure.

FIG. 3 illustrates an example of a computing device 300 (e.g., an apparatus) used for highlighting a tagged object with AR in accordance with a number of embodiments of the present disclosure. The computing device 300 can be an apparatus. As illustrated in FIG. 3, computing device 300 can include a processing resource (e.g., processor) 322, a memory 324, and a user interface 302. In some examples, the computing device 300 includes a camera (not illustrated) and/or sensors (e.g., tracking sensors, depth sensors, etc.). The computing device 300 can be, for example, a personal laptop computer, a desktop computer, a smart phone, a tablet, a wrist-worn device, a digital camera, and/or redundant combinations thereof, among other types of computing devices. The camera, in some examples, can be an AR camera (e.g., AR-specific camera) used to capture and highlight the tagged object.

The memory 324 can be any type of storage medium that can be accessed by the processing resource 322 to perform various examples of the present disclosure. For example, the memory 324 can be a non-transitory computer readable medium having computer readable instructions (e.g., computer program instructions) stored thereon that are executable by the processing resource 322 to identify an object tagged with a sensor within a plurality of objects, track movement of the object relative to other objects of the plurality of objects based on communication between the sensor and the apparatus, and highlight the object by displaying a location of the object via the user interface via AR based on the tracking and responsive to a request to locate the object.

In some examples, the object may be highlighted by providing a mapping of the object relative to the other objects, and that mapping can be displayed via the user interface as AR. For instance, if a user is looking to locate a particular vehicle in a dealership lot, he or she may request the vehicle's location, and a mapping of the lot may be viewed as AR, such that the user can follow a path by looking at his or her computing device to get to the particular vehicle. Additionally, the particular vehicle may be highlighted as the AR is viewed, for instance, an arrow may appear in the location of the particular vehicle. If other vehicles are tagged, the location of the particular vehicle may be highlighted relative to those other tagged vehicles. For instance, the user may be notified that he or she is three cars away.

In some examples, an inventory may be created of the object and an addition tagged object or objects. For instance, in the example involving the particular vehicle, an inventory of the particular vehicle, along with other tagged vehicles can be created and updated (e.g., dynamically updated) as a vehicle or vehicles change location (e.g., moved to showroom floor, sold, stolen, etc.). When a request is placed to find a location of one of the objects, an AR application can be launched, for instance, and a user can locate the vehicle, even if it has moved locations. For instance, as the user views real images (e.g., a dealership lot, showroom, etc.) on the user interface 302, AR can be displayed highlighting the desired object. In some instances, a route to the desired object can be displayed (e.g., instructing the user of upcoming turns, obstacles, etc.). In some examples, the AR may include a virtual path to follow to the highlighted object.

The inventory may be updated (e.g., dynamically updated) when a newly tagged vehicle is identified. For instance, if a previously untagged vehicle is tagged or a new vehicle that has been tagged arrives at the dealership, the inventor may be updated. As used herein, dynamically can include variable and/or constantly changing in response to a particular influence. For instance, as a tagged object (e.g., vehicle) is moved, the computing device 300 dynamically updates the object's location and/or an associated inventory. A communicative coupling can be maintained between the sensor or sensors and the computing device to allow for the dynamic updates.

A request to locate an object can be a trigger, for instance, to launch an AR application. The trigger, for instance, is received via user input (e.g., voice command, touch command, etc.), a camera, a sensor of the apparatus, or a combination thereof. The launching of a camera (e.g., general or AR-specific), the sensor communicating change in location or speed of a previously highlighted objection, the receipt of a request to launch an AR application, or a combination thereof can be triggers. For instance, a trigger may include a user may request to locate a particular vehicle via the computing device, may launch an AR-specific camera on the computing device, the computing device may receive a notification of movement of a particular vehicle, or the user can request to launch the AR application.

The memory 324, in some instances, can be a non-transitory computer readable medium having computer readable instructions stored thereon that are executable by the processing resource 322 to maintain a communicative coupling to a sensor used to tag an object, receive a request to locate the object, and launch an AR application responsive to the request. In some examples, the camera (e.g., an AR camera) is launched responsive to the request. The instructions can be executable to locate the object using the communicative coupling, highlight the object using the launched AR application, and display, via AR, the highlighted object via the user interface.

For example, a user may have a large, expensive jewelry collection. The user can tag some or all of the items with sensors communicatively coupled to a computing device. The communication can be maintained such that a user can highlight a tagged object to find a desired piece of jewelry and can be notified when an object changes location. This information, in some examples, may be used by an insurance company or shared with an insurance company for inventory or claim purposes.

In some examples, a communicative coupling can be maintained to a different sensor used to tag a different object or to a plurality of different sensors used to tag a plurality of different objects. The highlighted object can be displayed via AR relative to the different object or plurality of objects in such an example. For instance, if a user desires to locate a piece of tagged jewelry in a jewelry box, and each piece of jewelry is tagged, the user can view, via AR, the desired piece of jewelry not only highlighted, but relative to other pieces of tagged jewelry, which can improve the ease of locating the object. For instance, if the desired jewelry piece is a ring among a plurality of rings, it may be desired to see the desired ring highlighted, as well as how close it to rings in its proximity, or to a standout piece of jewelry, for instance (a large ring, a uniquely-shaped ring, etc.).

The object and the different object and/or plurality of different objects can be dynamically inventoried such that the inventory is updated responsive to a location change of the objected or a location change of the different object and/or one of the plurality of different objects. In the jewelry example, a user may maintain an inventory of the jewelry and be notified (and the inventory updated) when a tagged object is moved from its current location (e.g., removed from a jewelry box, moved to a different spot in the jewelry box, etc.).

In some examples, the user may be notified of a tagged object's change in location via visual (e.g., banners, text alerts, etc.), verbal (e.g., audible), or physical notifications. The notifications may be made via the computing device or a different computing device. For instance, the instructions can be executable to instruct a wearable device communicatively coupled to the computing device to provide a physical indication, verbal indication, and/or a visual indication of a location change to a wearer of the wearable device. For instance, the wearable device (e.g., a smartwatch, smart glasses, fitness tracker, etc.) may vibrate when a tagged object is moved. The wearable device may emit a verbal command, which can accompany AR highlighting the new location of the tagged object on the display of the user interface 302. In some instances, the wearable device also has a user interface that can display the AR. The wearable device may use any combination of the indications, among others. While a wearable device is described herein, other computing devices may be communicatively coupled to the computing device and receive indications. For instance, if the computing device is a smartphone, and the user has a communicatively coupled tablet in his or her briefcase, the tablet may also provide indications of a tagged object's location change.

The memory 324 can be volatile or nonvolatile memory. The memory 324 can also be removable (e.g., portable) memory, or non-removable (e.g., internal) memory. For example, the memory 324 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 324 is illustrated as being located within computing device 300, embodiments of the present disclosure are not so limited. For example, memory 324 can be located on an external computing resource (e.g., enabling computer readable instructions to be downloaded over the Internet or another wired or wireless connection).

As illustrated in FIG. 3, computing device 300 includes a user interface 302. A user (e.g., operator) of computing device 300, can interact with computing device 300 via a user interface 302 shown on a display. For example, the user interface 302 via a display can provide (e.g., display and/or present) information to the user of computing device 300, and/or receive information from (e.g., input by) the user of computing device 300. For instance, in some embodiments, the user interface 302 can be a GUI that can provide and/or receive information to and/or from the user of computing device 300. The display showing the user interface 302 can be, for instance, a touchscreen (e.g., the GUI can include touchscreen capabilities).

Figure 4:
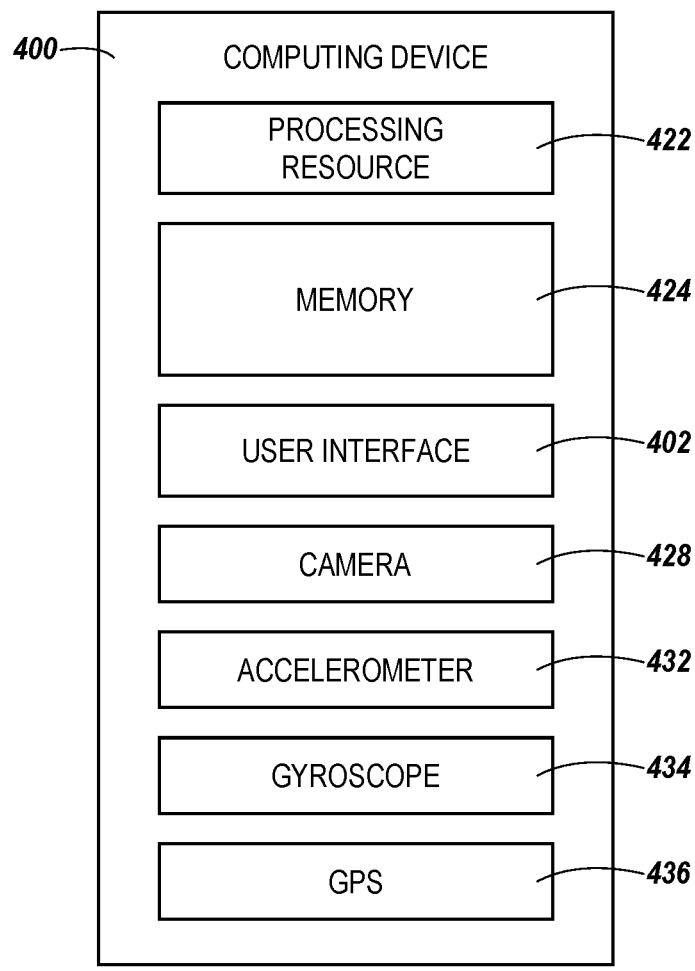
FIG. 4 illustrates another example of a computing device used for highlighting a tagged object with AR in accordance with a number of embodiments of the present disclosure.

FIG. 4 illustrates another example of a computing device 400 (e.g., an apparatus) used for highlighting a tagged object with AR in accordance with a number of embodiments of the present disclosure. Computing device 400 can correspond to computing device 300 in FIG. 3. Computing device 400 can include a processing resource 422, a memory 424, a user interface 402, and a camera 428. The processing resource 422, the memory 424, and the user interface 402 can correspond to the processing resource 322, the memory 324, and the user interface 302, respectively in FIG. 3. As illustrated in FIG. 4, computing device 400 can further include a camera 428, an accelerometer 432, a gyroscope 434, and a GPS 436.

The accelerometer 432, the gyroscope 434, the camera 428, and/or the GPS 436 can be located on the computing device 400, as illustrated in FIG. 4, or external to the computing device 400. A location and/or change in acceleration or speed of the computing device 400 can be determined via the accelerometer 432, the gyroscope 434, and/or the GPS 436.

Figure 5:
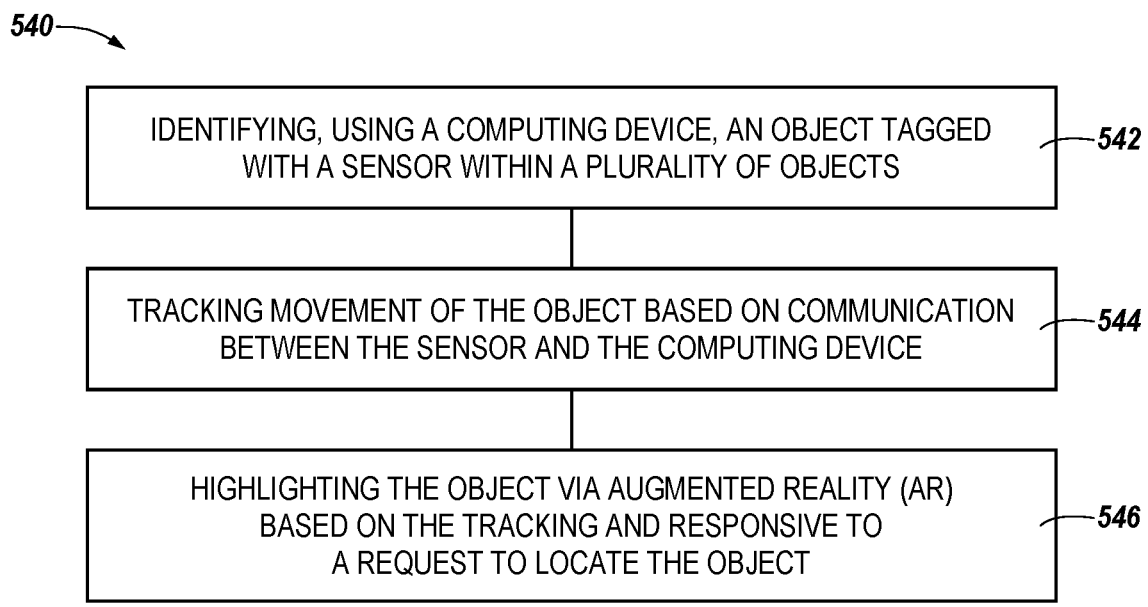
FIG. 5 is a flow diagram of a method for highlighting a tagged object with AR in accordance with a number of embodiments of the present disclosure.

FIG. 5 is a flow diagram of a method 540 for highlighting a tagged object with AR in accordance with a number of embodiments of the present disclosure. The method 540 can be performed, for instance, using a computing device such as computing device 300 or 400 described with respect to FIGS. 3 and 4.

At 542, the method 540 includes identifying, using a computing device, an object tagged with a sensor within a plurality of objects. For instance, a user in a warehouse may desire to find a particular tagged object. The computing device may receive a request to locate the particular object and identify the object. The identification can include recognition that the object is tagged and/or that a location of the object is known.

At 544, the method 540 includes tracking movement of the object based on communication between the sensor and the computing device. For instance, as the sensor moves, the computing device can receive information about the location of the sensor, and as a result the tagged object, allowing for movement tracking and location identification. In some examples, the movement of the object is tracked relative to a first location, and the indication of the movement of the object relative to the first location can be displayed on the computing device via the AR. For instance, the particular tagged object may be moved from its correct storage location A to location B, purposefully or accidentally, with or without malice. When communication is maintained between the sensor and the particular tagged object, location changes can be tracked, and routes from location A to location B can be provided to a user, and the location can be highlighted via AR on the user interface. These changes in location can be displayed to the user, such that the tagged object's path can be visualized.

The method 540, at 546, includes highlighting the object via AR based on the tracking and responsive to a request to locate the object. For instance, when tracked as noted above, a user requesting a location of the particular tagged object can be shown, via AR, a location of the particular tagged object. The request can include a literal request, a request to launch an AR application or applications, a request to launch an AR camera, or a received notification (e.g., at the computing device) of a location change of the particular tagged object. In some examples, highlighting the object via AR can include displaying via a user interface of the computing device a location of the object with respect to the plurality of objects via the AR. For instance, if other objects are tagged, a user may see via AR the location of the particular tagged object with respect to other tagged objects (e.g., the particular tagged object is highlighted in green, the other items are shaded to make the particular tagged object further stand out). A route to the object can be displayed via the user interface using AR, in some examples. For instance, a user may be instructed how to get from location A to location B where the particular tagged object is currently located or from their current location (e.g., not location A) to location B.

In some examples, a notification can be provided (e.g., to the computing device) responsive to a change in location of the object and/or a loss of communication between the sensor and the computing device. For instance, if communication is maintained between the sensor and the computing device, the object can be dynamically tracked. When an object is moved (e.g., misplaced, stolen, lost, etc.) or communication is lost, a user can be notified via the computing device or a different computing device (e.g., a wearable device communicatively coupled to the computing device), such that the user is made aware something has changed.

In some instances, each object in the plurality of objects is tagged with a sensor, and assembly of a particular item is displayed using AR and via the user interface of the computing device. The assembly includes using at least a portion of the object and the plurality of objects. For instance, if the objects are parts of a chair, the user may locate the objects (e.g., via highlighting and AR), and assemble the objects into a chair, as described with respect to the objects 208 in FIG. 2. The objects can be highlighted via the user interface and AR, and the assembly can be shown via AR to the user in step-by-step instructions, as a final assembly display or any combination thereof.

In a non-limiting example, the object may be an intelligent object such as a vacuum cleaning robot. In such an example, AR may be launched on an associated application and a route of the vacuum cleaning robot may be displayed via the app or launched on a platform with other objects. In another non-limiting example, the robot may find tagged objects as it travels around a room.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
identifying, using a computing device, first object tagged with a sensor within a plurality of tagged objects;
inventorying the plurality of tagged objects including the first object such that the inventory is updated responsive to identification of an addition of a newly tagged object to the plurality of tagged objects;
tracking movement of the first object and the plurality of tagged objects based on communication between the sensor, sensors associated with the plurality of tagged objects, and the computing device; and
highlighting the object via augmented reality (AR) relative to the plurality of tagged objects based on the tracking and responsive to a request to locate the object.

2. The method of claim 1, further comprising tracking the movement of the first object relative to a first location; and
displaying an indication of the movement of the first object relative to the first location on the computing device via the AR.

3. The method of claim 1, wherein highlighting the first object via AR comprises displaying via a user interface of the computing device a location of the first object with respect to and relative to the plurality of tagged objects via the AR.

4. The method of claim 1, wherein highlighting the first object via AR comprises providing a route to the first object via the AR, wherein the AR is displayed via a user interface of the computing device.

5. The method of claim 1, further comprising launching an AR application on the computing device responsive to a request to locate the first object to highlight the first object via AR.

6. The method of claim 1, wherein each object in the plurality of tagged objects is tagged with a sensor, and wherein the method further comprises displaying, via a user interface of the computing device, assembly of a particular item using at least a portion of the first object and the plurality of tagged objects.

7. The method of claim 1, further comprising providing a notification to the computing device responsive to a change in location of the first object.

8. The method of claim 1, further comprising providing a notification to the computing device responsive to a loss of communication between the sensor and the computing device.

9. An apparatus, comprising:
a user interface;
a memory; and
a processor configured to execute executable instructions stored in the memory to:
identify a first object tagged with a sensor within a plurality of tagged objects;
track movement of the first object relative to other objects of the plurality of tagged objects based on communication between the sensor, sensors associated with each of the plurality of tagged objects, and the apparatus;
inventory the plurality of tagged objects such that the inventory is updated responsive to identification of an addition of a newly tagged object to the plurality of tagged objects; and
highlight the first object by displaying a location of the first object via the user interface via augmented reality (AR) based on the tracking and responsive to a request to locate the first object.

10. The apparatus of claim 9, further comprising the instructions executable to:
highlight the first object by providing a mapping of the first object relative to the plurality of tagged objects; and
display via the user interface the mapping as AR.

11. The apparatus of claim 9, further comprising the instructions executable to:
highlight the newly tagged object responsive to a request to locate the the newly tagged object.

12. The apparatus of claim 11, wherein the inventory is updated responsive to a location change of the first object or a location change of the newly tagged object.

13. The apparatus of claim 11, wherein the inventory is updated responsive to a location change of a second tagged object of the plurality of tagged objects.

14. The apparatus of claim 9, further comprising the instructions executable to receive a trigger at the apparatus to launch an AR application responsive to the request to locate the first object.

15. The apparatus of claim 14, further comprising the instructions executable to receive the trigger from user input, a camera of the apparatus, a sensor of the apparatus, or a combination thereof.

16. An apparatus, comprising:
a camera;

a user interface;
a memory; and
a processor configured to execute executable instructions stored in the memory to:
    maintain a communicative coupling to a plurality of different sensors used to tag a plurality of different objects;
    dynamically inventory the plurality of different objects such that the inventory is updated responsive to identification of an addition of a newly tagged object to the plurality of different objects;
    receive a request to locate a first object of the plurality of different objects;
    launch an augmented reality (AR) application responsive to the request;
    locate the first object using the communicative coupling;
    highlight the first object using the launched AR application; and
    display, via AR, the highlighted first object relative to the plurality of different objects via the user interface.

17. The apparatus of claim 16, wherein the camera is an AR camera, and the apparatus further comprises instructions executable to capture and highlight the first object using the AR camera.

18. The apparatus of claim 16, wherein the camera is an AR camera and the apparatus further comprising the instructions executable to launch an AR camera responsive to the request to locate the first object.

19. The apparatus of claim 16, further comprising the instructions executable to:
    maintain a communicative coupling to a different sensor used to tag a different object of the plurality of different objects; and
    display, via AR, the highlighted first object relative to the different object via the user interface.

20. The apparatus of claim 16, further comprising the instructions executable to:
    maintain a communicative coupling to a plurality of different sensors used to tag the plurality of different objects;
    dynamically inventory the first object and the plurality of different objects such that the inventory is updated responsive to a location change of the first object or a location change of one of the plurality of different objects; and
    display, via AR, the highlighted first object relative to the plurality of different objects via the user interface.

\* \* \* \* \*